(12) United States Patent
Sutcu et al.

(10) Patent No.: US 9,140,193 B2
(45) Date of Patent: Sep. 22, 2015

(54) GAS TURBINE IGNITER WITH STRUCTURE TO REDUCE RADIAL MOVEMENT OF IGNITER ROD

(75) Inventors: Muzaffer Sutcu, Oviedo, FL (US); Ulrich Woerz, Oviedo, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 1164 days.

(21) Appl. No.: 13/099,507

(22) Filed: May 3, 2011

(65) Prior Publication Data

US 2012/0279195 A1 Nov. 8, 2012

(51) Int. Cl.
*F02C 7/266* (2006.01)
*F02C 7/264* (2006.01)

(52) U.S. Cl.
CPC ...................... *F02C 7/266* (2013.01)

(58) Field of Classification Search
CPC .......... F02C 7/266; F02C 7/264; F02P 15/00; F23D 2207/00
USPC .......................................... 60/39.821, 39.827
See application file for complete search history.

(56) References Cited

U.S. PATENT DOCUMENTS

| | | | |
|---|---|---|---|
| 2,604,510 A | | 7/1952 | Berkey |
| 2,831,993 A | * | 4/1958 | Lentz ............................ 313/11.5 |
| 3,330,985 A | * | 7/1967 | Johnston ........................ 313/120 |
| 3,750,392 A | * | 8/1973 | Zoll ............................ 60/39.827 |
| 4,275,559 A | | 6/1981 | Blair |
| 4,764,703 A | * | 8/1988 | Meyer ............................ 313/126 |
| 4,903,476 A | | 2/1990 | Steber et al. |
| 5,402,637 A | | 4/1995 | Adam |
| 6,363,898 B1 | | 4/2002 | Ripma et al. |
| 6,438,940 B1 | * | 8/2002 | Vacek et al. .................... 60/204 |
| 6,442,929 B1 | | 9/2002 | Kraft et al. |
| 6,920,762 B2 | | 7/2005 | Wells et al. |

* cited by examiner

*Primary Examiner* — Phutthiwat Wongwian
*Assistant Examiner* — Carlos A Rivera

(57) ABSTRACT

An improved gas turbine igniter (10) is provided. Turbine igniter (10) may include a guide tube (14). An igniter rod (12) may be disposed in the guide tube and extend from a hot-end region (16) to a cold-end region (18). A piston (20) may be connected to igniter rod (12). A cap (22) may be connected to guide tube (14). Cap (22) defines an access passageway (24) to the igniter rod. Structure (50) is arranged to reduce a range of radial movement of igniter rod (12) in the access passageway.

10 Claims, 4 Drawing Sheets

GAS TURBINE IGNITER WITH STRUCTURE TO REDUCE RADIAL MOVEMENT OF IGNITER ROD

FIELD OF THE INVENTION

The present invention is generally directed to gas turbine engines, and, more particularly, to a gas turbine igniter, and even more particularly to mechanical structures for improving operational aspects of a gas turbine igniter.

BACKGROUND OF THE INVENTION

An igniter for a gas turbine engine should be capable of reliably and cost-effectively igniting a combustible mixture during numerous starts that occur throughout operational cycles of the engine. The igniting function is generally accomplished by electrically-generating a spark across a gap formed between oppositely charged electrodes in a retractable igniter rod. The igniter rod may be a slender columnar structure, which in an ignition-position is deployed into a path of the combustible mixture (e.g., hot gas path) in a combustion chamber. The ignition takes place when velocity and pressure of compressed air in the chamber reach predetermined values.

After ignition, the igniter rod is designed to retract (e.g., to a retracted-position) into a protective structure (e.g., a guide tube) away from the hot combustion environment in response to continued compressor discharge pressure in the chamber throughout a working operational cycle of the engine.

The igniter may be internally equipped with a compression spring and a movable piston, as may be assembled in the guide tube of the igniter so that the igniter rod remains subject to compression force from the spring in the retracted position during working operation of the engine. Force from the compressed spring would return the igniter to the ignition-position after engine shutdown, such as when compressor discharge pressure is discontinued and the air pressure in the chamber essentially returns to ambient conditions.

The generally slender columnar structure of the igniter rod could make it susceptible to vibration, which commonly develops during normal engine operation, and/or to a load magnification due to cantilever beam loading. In certain situations, side loading (e.g., due to gravity on the igniter rod and/or the weight of electrical cables suspended at the cold-end of the rod), could lead to undesirable mechanical-pinching conditions between the moving piston and the guide tube or could affect the integrity of a threaded-connection (located proximate the hot environment) between the piston and the igniter rod.

It is standard practice that for reliable and cost-effective operation, the igniter may include components which may need periodic replacement during the life of the igniter. For example, the igniter rod may be replaced often during the life of the igniter due to sparking life limitations of the electrodes.

In view of the foregoing considerations, it would be desirable to provide improved mechanical structures for gas turbine igniters, as, for example, may eliminate or substantially reduce the foregoing effects. It would be further desirable to provide relatively low-cost and user-friendly mechanical structures as may be conducive to reliable and quick-replacement of components, which may need replacement during the life of the igniter.

BRIEF DESCRIPTION OF THE DRAWINGS

The invention is explained in the following description in view of the drawings that show.

DETAILED DESCRIPTION OF THE INVENTION

Figure 1:
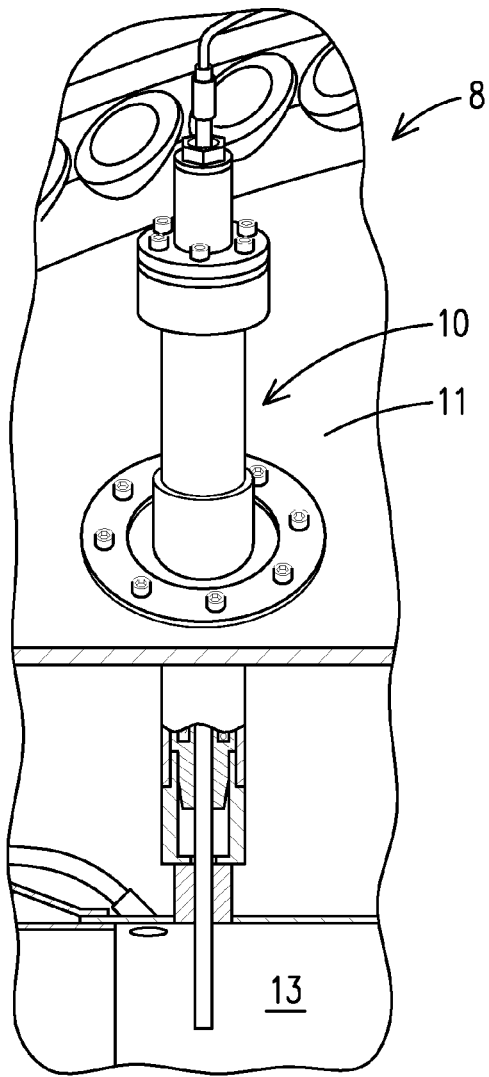
FIG. 1 is a fragmentary view of a gas turbine as may include a gas turbine igniter embodying aspects of the present invention.

FIG. 1 is a fragmentary representation of a gas turbine 8 including a gas turbine igniter 10 embodying aspects of the present invention. Gas turbine igniter 10 may be mounted in a casing 11 for igniting a combustible mixture in a chamber 13.

Figure 2:
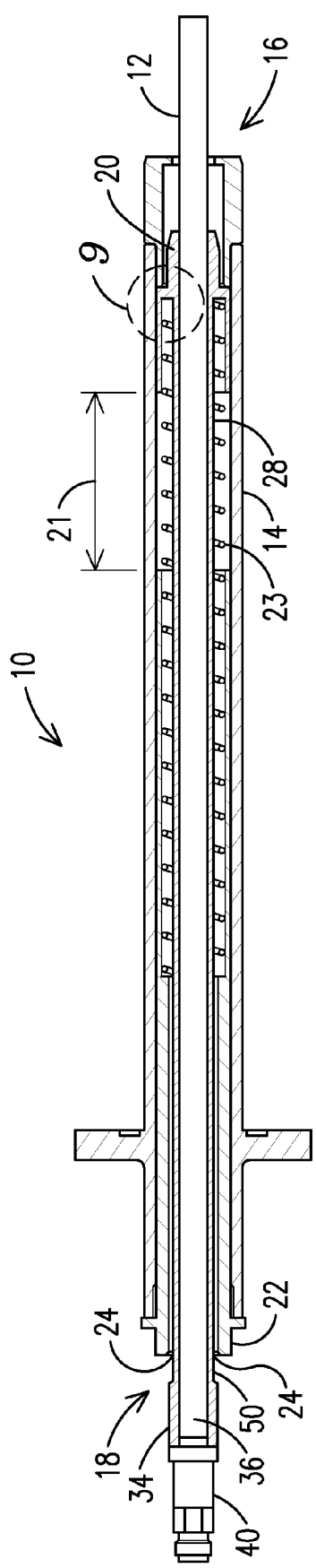
FIG. 2 is a cross-sectional view of an example embodiment of a gas turbine igniter embodying aspects of the present invention.

FIG. 2 is a cross-sectional view of gas turbine igniter 10 embodying aspects of the present invention, which are directed to certain mechanical aspects in connection with the gas igniter. Accordingly, for the sake of avoiding pedantic and unnecessary description, we will attempt to spare the reader from details, which would be readily known to one skilled in the art, such as electrical aspects in connection with the gas igniter.

In one example embodiment, gas turbine igniter 10 includes an igniter rod 12, as may be disposed in a guide tube 14, which may extend from a hot-end region 16 to a cold-end region 18. In one example embodiment, a piston 20 is connected to the igniter rod, as described in greater detail below. Piston 20 may be located proximate hot-end region 16.

As will be readily appreciated by one skilled in the art, igniter rod 12 is shown in FIG. 2 in an ignition position, (igniter rod 12 is fully extended into hot region 16 and a spring 23 is in an uncompressed state). Subsequent to ignition and during turbine operation, in response to compressor discharge pressure, piston 20 (including rod 12) would travel a stroke distance 21 so that rod 12 reaches a retracted position protected within guide tube 14. In the retracted position spring 23 would be in a compression state.

In one example embodiment, a cap 22 (partially shown in FIG. 3) is connected to guide tube 14. Cap 22 defines an access passageway 24 to igniter rod 12 proximate cold-end region 18.

Figure 4:
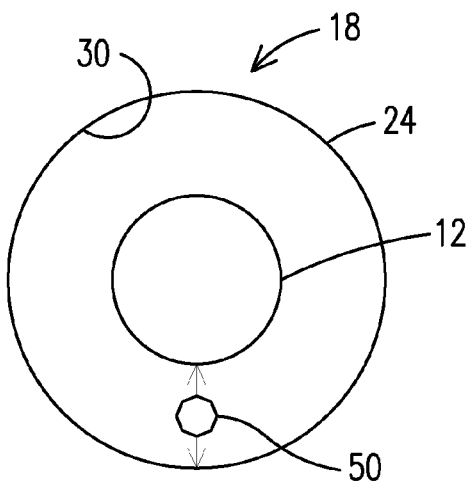
FIG. 4 is a conceptual schematic of a symbolically-represented structure, which in accordance with aspects of the present invention is arranged to reduce a range of radial movement of an igniter rod in an access passageway proximate the cold-end region of the gas turbine igniter.

As illustrated in the conceptual schematic shown in FIG. 4, in accordance with aspects of the present invention, a structure 50, (which for the sake of avoiding cluttering details is just symbolically represented in FIG. 4) is arranged to reduce a range of radial movement of igniter rod 12 in access passageway 24. For example, it should be appreciated that in the absence of structure 50, as done in a known igniter design, load magnification effects could result due to cantilever beam loading. For example, in certain situations, a lateral loading, such as due to gravity on the igniter rod and/or the weight of electrical cables suspended at the cold end of the rod, could cause a mechanical-pinching condition (igniter rod unable to return to an ignition position) between piston 20 and guide tube 14, located proximate hot-end region 16. Moreover, in the absence of structure 50, vibration effects could lead to igniter rod chattering. Accordingly, the inclusion of structure 50, which is arranged to reduce radial movement of igniter rod 12 in the access passageway, is believed to substantially alleviate the foregoing effects, which otherwise could deleteriously affect igniter operation.

Returning to FIG. 2, in one example embodiment piston 20 may include a piston tube 28, which extends towards cold-end region 18 and surrounds igniter rod 12 beyond guide tube 14. In one example embodiment, piston tube 28 constitutes the above-discussed structure 50. That is, the structure arranged to reduce the range of radial movement of igniter rod 12 in access passageway 24.

Figure 3:
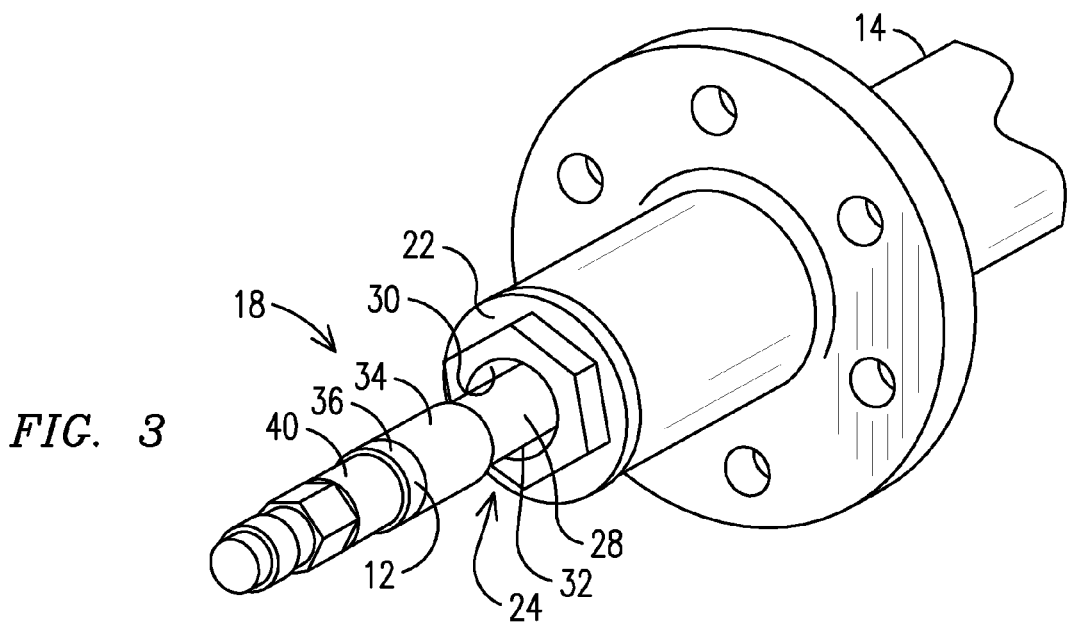
FIG. 3 is an isometric view of a cold-end region of the gas turbine igniter shown in FIG. 3.

In one example embodiment, as may be better appreciated in FIG. 3, piston tube 28 provides a slidable contact in the access passageway between an inner surface 30 of cap 22 and an outer surface 32 of piston tube 28. In one example embodiment, an end portion 34 of piston tube 28 proximate cold end region 18 and disposed outside guide tube is threadingly connected (e.g., by way of corresponding threads) to a corresponding end portion 36 of igniter rod 12. This aspect may be desirable since is conducive to a reliable and quick-replacement of igniter rod 12. By way of comparison, in a known igniter design, the threaded-connection between the piston and the igniter rod is located proximate the hot-end region, where such a connection is much less user-friendly in terms of accessibility and could be affected due to thermal loads and gradients that may develop near the hot-end region. In one example embodiment, end portion 36 of igniter rod 12 may interface with an electrical connector 40, as may connect to one or more electrical leads (not shown).

Figure 5:
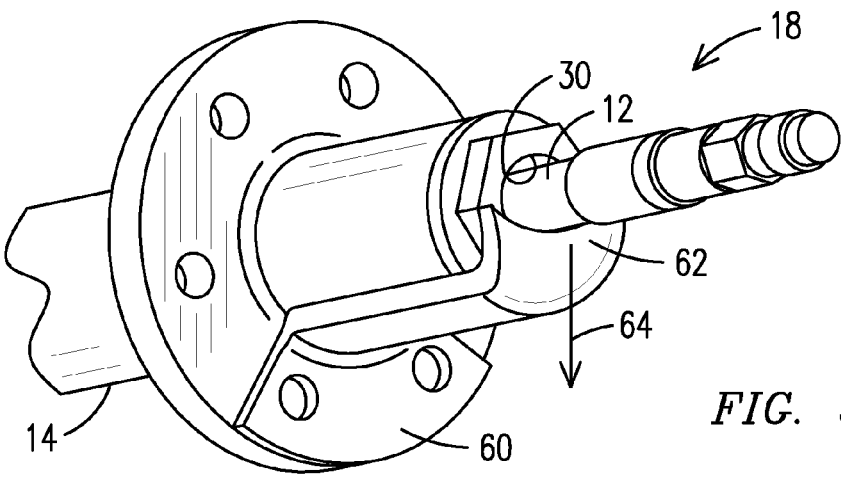
FIG. 5 is one example embodiment of structure arranged to reduce the range of radial movement of the igniter rod.

FIG. 5 is an isometric view of an example embodiment where structure 50 (FIG. 4), which is arranged to reduce the range of radial movement of igniter rod 12 at the access passageway may be a bracket 60 connected to guide tube 14 proximate cold-end region 18 and including a support member 62 positioned to radially support igniter rod 12 at a fixed position in the access passageway. In one example embodiment, support member 62 may be positioned to substantially support igniter rod 12 against gravity, as symbolically represented by line 64.

Figure 6:
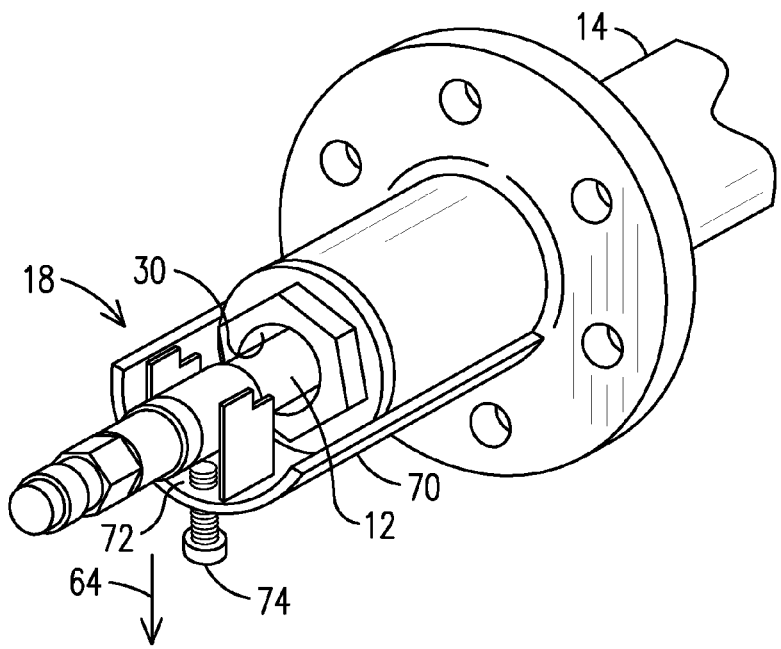
FIG. 6 is another example embodiment of structure arranged to reduce the range of radial movement of the igniter rod.

FIG. 6 is an isometric view of an example embodiment where structure 50 (FIG. 4), which is arranged to reduce the range of radial movement of igniter rod 12 at the access passageway may be a bracket 70 connected to guide tube 14 proximate cold-end region 18 and including a support member 72 positioned to radially support igniter rod 12 in the access passageway. In this example embodiment, support member 72 may include an adjuster mechanism 74 (e.g., a screw) to set the support for igniter rod 12 at a selectable position in the access passageway. For example, this may allow centering igniter rod in the access passageway.

Figure 7:
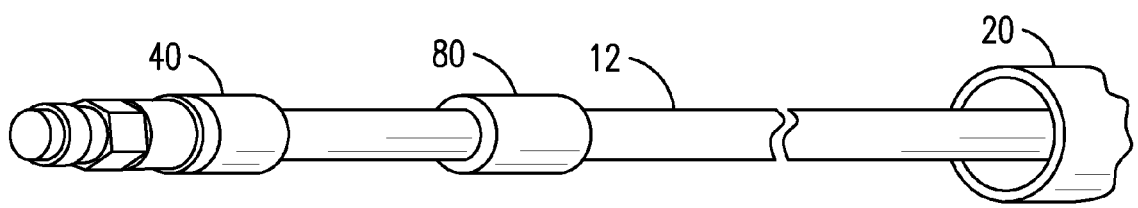
FIG. 7 is yet another example embodiment of structure arranged to reduce the range of radial movement of the igniter rod.

FIG. 7 is a schematic an example embodiment where structure 50 (FIG. 4), which is arranged to reduce the range of radial movement of igniter rod 12 at the access passageway may be a sleeve 80 affixed to at least a portion of igniter rod 12 which extends through the access passageway when igniter rod 12 is in a retracted position.

Figure 8:
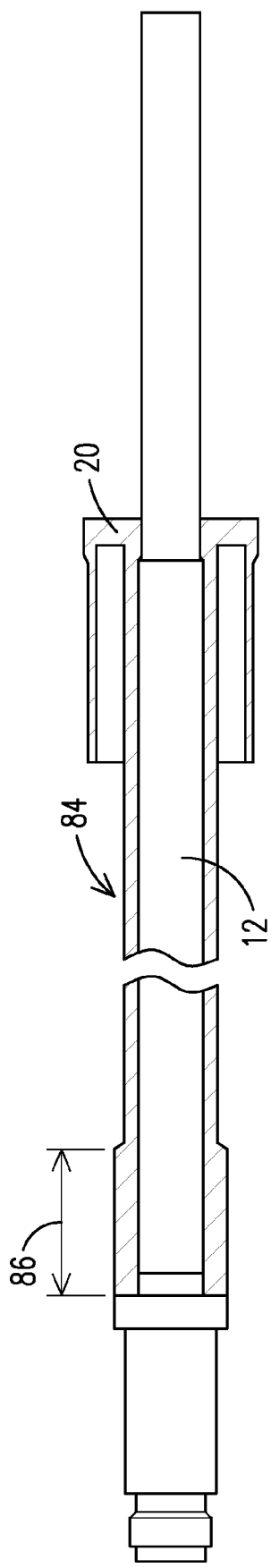
FIG. 8 is a partial cross-sectional view of an example embodiment where the igniter rod and a piston of the gas turbine igniter are fixedly connected to one another to form an integral component.

FIG. 8 is a partial cross-sectional view of an example embodiment where piston 20 is fixedly connected to igniter rod 12 (e.g., using welding and/or brazing techniques, as would be readily known to one skilled in the art). In this example embodiment, piston 20 and igniter rod 12 essentially function as an integral component 84 (no threaded connection between the igniter rod and the piston). In this example embodiment, at least a portion (as may be represented by line 86) of integral component 84, as may extend through the access passageway when the igniter rod is in a retracted position constitutes structure 50 (FIG. 4), which is arranged to reduce the range of radial movement of the igniter rod at the access passageway. For example, portion 86 of integral component 84 may be configured with a larger outer diameter relative to the outer diameter of the remainder portion of integral component 84.

Figure 9:
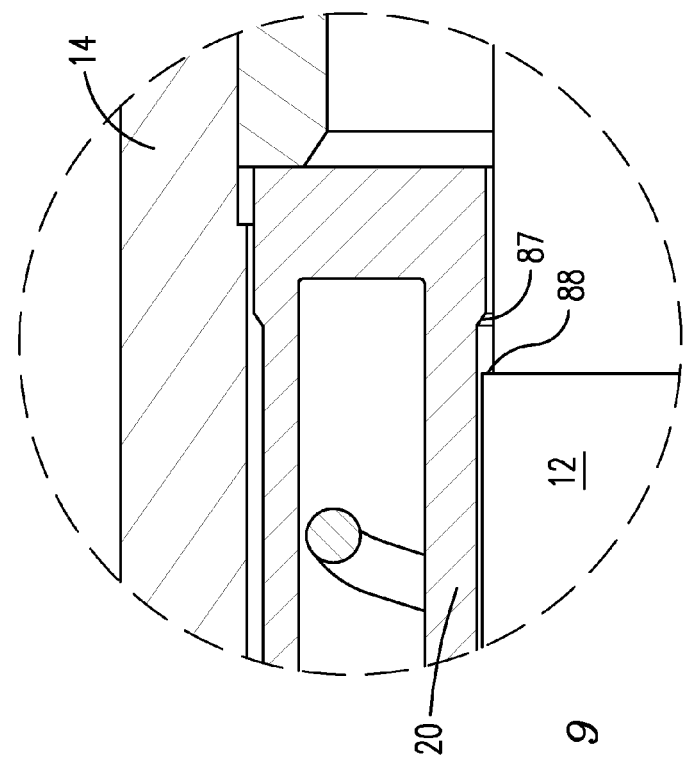
FIG. 9 is a zoomed-in view within an inset 9 shown in FIG. 2.

FIG. 9 provides a zoomed-in view within an inset 9 shown in FIG. 2. This zoomed-in view should be helpful to appreciate example structural details of a rod-stopping structure as may be arranged to prevent separation of igniter rod 12 into chamber 13 (FIG. 1). In one example embodiment, the rod-stopping structure may include a stepped surface 87 disposed on an inner surface of piston 20. Stepped surface 87 is arranged to engage a corresponding step 88 constructed on an outer surface of igniter rod 12 in the event of separation of the igniter rod.

Figure 10:
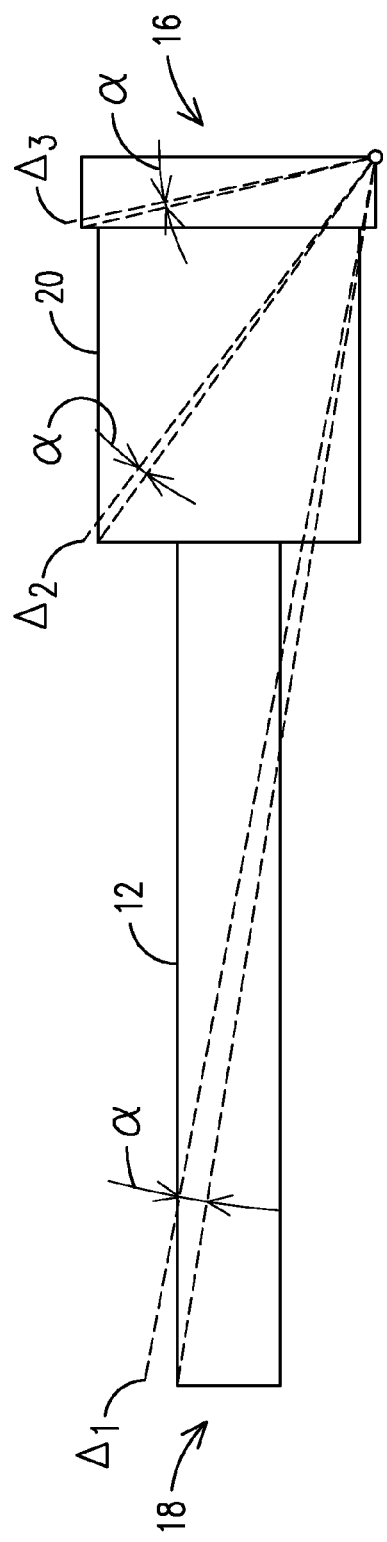
FIG. 10 is a conceptual diagram which should be helpful to appreciate certain example operational advantages resulting from structural aspects of the present invention.

FIG. 10 is a conceptual schematic view which should be helpful to appreciate operational advantages resulting from the innovative structural aspects of the present invention. For a given angular rotation (represented by $\alpha$), $\Delta_1$ represents example radial displacement of igniter rod 12 within access passageway 24, which in accordance with aspects of the present invention is limited (e.g., constrained) in view of the inclusion of structure 50 (FIG. 4). For the same angular rotation $\alpha$, $\Delta_2$ and $\Delta_3$ represent respective radial displacements of example surfaces of piston 2. In accordance with aspects of the present invention, the radial displacement of igniter rod 12 within access passageway 24 is sufficiently limited by structure 50 so that the resulting radial displacement of surfaces of piston 20 (e.g., $\Delta_2$ and $\Delta_3$) are in turn sufficiently limited to avoid mechanical pinching of piston 20 against a corresponding inner surface of guide tube 14. Therefore, from the foregoing discussion it should be appreciated that in operation, aspects of the present invention, are effective to avoid or substantially reduce side loading effects (as may develop due to gravity on the igniter rod and/or the weight of electrical cables suspended at the cold end of the rod), which otherwise could lead to undesirable mechanical-pinching conditions between the moving piston and the guide tube.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:
1. A gas turbine igniter comprising:
a guide tube;
an igniter rod disposed in the guide tube and extending from a hot-end region to a cold-end region;
a piston connected to the igniter rod, the piston located proximate the hot-end region;

a cap connected to the guide tube, wherein the cap defines an access passageway to the igniter rod; and wherein the piston abuts a portion of the igniter rod to reduce a range of radial movement of the igniter rod in the access passageway.

2. The gas turbine igniter of claim 1, wherein the piston comprises a piston tube which extends towards the cold-end region, wherein the piston tube abuts the portion of the igniter rod to reduce the range of radial movement of the igniter rod in the access passageway.

3. The gas turbine igniter of claim 2, wherein the piston tube provides a slidable contact in the access passageway between an inner surface of the cap and an outer surface of the piston tube.

4. The gas turbine igniter of claim 2, wherein an end portion of the piston tube is threadlingly connected to the igniter rod.

5. The gas turbine igniter of claim 4, wherein an end portion of the igniter rod threadlingly connected to the end portion of the piston tube proximate the cold-end regions interfaces with an electrical connector.

6. The gas turbine igniter of claim 4, further comprising a rod-stopping structure arranged to prevent separation of the igniter rod into the hot-end region.

7. The gas turbine igniter of claim 6, wherein the rod-stopping structure comprises a stepped surface disposed on an inner surface of the piston arranged to engage a corresponding step constructed on an outer surface of the igniter rod in the event of separation of the igniter rod.

8. The gas turbine igniter of claim 1, wherein the piston is fixedly connected to the igniter rod and the portion of the igniter rod which extends through the access passageway when the igniter rod is in a retracted position to reduce the range of radial movement of the igniter rod at the access passageway.

9. A gas turbine igniter comprising:
a guide tube;
an igniter rod disposed in the guide tube and extending from a hot-end region to a cold-end region;
a piston connected to the igniter rod, the piston located proximate the hot-end region;
a cap connected to the guide tube, wherein the cap defines an access passageway to the igniter rod;
a bracket connected to the guide tube proximate the cold-end region and including a support member abutting the igniter rod to radially support the igniter rod at a fixed position and to reduce a range of radial movement of the igniter rod in the access passageway.

10. A gas turbine igniter comprising:
a guide tube;
an igniter rod disposed in the guide tube and extending from a hot-end region to a cold-end region;
a piston connected to the igniter rod, the piston located proximate the hot-end region;
a cap connected to the guide tube, wherein the cap defines an access passageway to the igniter rod;
a bracket connected to the guide tube proximate the cold-end region and including a support member positioned to radially support the igniter rod in the access passageway, wherein the support member includes an adjuster mechanism to set the support member for the igniter rod at a selectable position to reduce a range of radial movement of the igniter rod in the access passageway.

* * * * *